(12) United States Patent
Mun

(10) Patent No.: US 10,979,773 B2
(45) Date of Patent: Apr. 13, 2021

(54) GENERATION OF TIME SLICE VIDEO HAVING FOCUS ON SELECTED OBJECT

(71) Applicant: KT CORPORATION, Seongnam-si (KR)

(72) Inventor: Jun Hee Mun, Yongin-si (KR)

(73) Assignee: KT CORPORATION, Seongnam-Si (KR)

( * ) Notice: Subject to any disclaimer, the term of this patent is extended or adjusted under 35 U.S.C. 154(b) by 0 days.

(21) Appl. No.: 16/400,521

(22) Filed: May 1, 2019

(65) Prior Publication Data

US 2019/0261055 A1 Aug. 22, 2019

Related U.S. Application Data

(63) Continuation of application No. PCT/KR2017/012170, filed on Oct. 31, 2017.

(30) Foreign Application Priority Data

Nov. 1, 2016 (KR) .......................... 10-2016-0144686

(51) Int. Cl.
*H04N 7/173* (2011.01)
*H04N 21/4728* (2011.01)
(Continued)

(52) U.S. Cl.
CPC .......... *H04N 21/4728* (2013.01); *G06T 7/00* (2013.01); *G06T 7/73* (2017.01); *H04N 5/232* (2013.01);
(Continued)

(58) Field of Classification Search
None
See application file for complete search history.

(56) References Cited

U.S. PATENT DOCUMENTS 5,838,366 A * 11/1998 Snape ................... G01S 3/7864
348/170
9,749,738 B1 * 8/2017 Adsumilli .............. H04R 3/005
(Continued)

FOREIGN PATENT DOCUMENTS

JP 2003107603 A 4/2003
JP 2007133660 A 5/2007
(Continued)

OTHER PUBLICATIONS

International Search Report (in English and Korean) issued in PCT/KR2017/012170, dated Jan. 29, 2018, 4 pages provided.
(Continued)

*Primary Examiner* — William J Kim
(74) *Attorney, Agent, or Firm* — Hamre, Schumann, Mueller & Larson, P.C.

(57) ABSTRACT

A video providing server that provides a time slice video includes a receiving unit that receives a first time slice video that is generated from images captured by multiple cameras having a focus on a first object; an input unit that receives, from a user device, a selection of a second object among multiple objects displayed in the first time slice video; a feature point extraction unit that extracts feature points of the selected second object; a generation unit that generates a second time slice video having a focus on the second object based on the extracted feature points of the second object; and a transmitting unit that transmits, to the user device, the second time slice video having the focus on the second object.

17 Claims, 8 Drawing Sheets

(51) Int. Cl.
*H04N 21/218* (2011.01)
*H04N 21/234* (2011.01)
*H04N 21/239* (2011.01)
*H04N 21/2343* (2011.01)
*H04N 5/232* (2006.01)
*G06T 7/73* (2017.01)
*G06T 7/00* (2017.01)

(52) U.S. Cl.
CPC ... *H04N 21/21805* (2013.01); *H04N 21/2343* (2013.01); *H04N 21/2393* (2013.01); *H04N 21/23418* (2013.01)

(56) References Cited

U.S. PATENT DOCUMENTS

| | | | | |
|---|---|---|---|---|
| 2004/0021767 | A1* | 2/2004 | Endo | H04N 5/2259 348/42 |
| 2007/0070201 | A1* | 3/2007 | Yokomitsu | G06T 7/246 348/169 |
| 2011/0025853 | A1* | 2/2011 | Richardson | H04N 5/247 348/159 |
| 2012/0169882 | A1 | 7/2012 | Millar et al. | |
| 2013/0141525 | A1* | 6/2013 | Williams | G06T 7/00 348/38 |
| 2014/0362099 | A1* | 12/2014 | Sakamoto | G06T 15/205 345/581 |
| 2015/0116501 | A1 | 4/2015 | Mccoy et al. | |
| 2015/0116502 | A1* | 4/2015 | Um | G06T 17/00 348/169 |
| 2016/0227128 | A1 | 8/2016 | Um et al. | |

FOREIGN PATENT DOCUMENTS

| | | | |
|---|---|---|---|
| KR | 10 20070000994 | A | 1/2007 |
| KR | 10 20090037247 | A | 4/2009 |
| KR | 10 20150050172 | A | 5/2015 |
| KR | 10 20150131668 | A | 11/2015 |
| KR | 10 20160021706 | A | 2/2016 |
| KR | 10 20160022636 | A | 3/2016 |
| KR | 10 20160058519 | A | 5/2016 |

OTHER PUBLICATIONS

European Search Report for European Application No. 17868113.6, dated Apr. 22, 2020.

* cited by examiner

GENERATION OF TIME SLICE VIDEO HAVING FOCUS ON SELECTED OBJECT

TECHNICAL FIELD

The present disclosure relates to a technologies for providing a time slice video having a focus on a selected object.

BACKGROUND

Time slice techniques refer to imaging technologies by which respective cameras face an object from various angles and simultaneously take photos of the object, and the photos are digitally connected, thereby producing a standstill image of the object that appears to have been captured with a movie camera. A time slice shows the object in 3D that appears to transcend time and space.

Time slice techniques may be applied only to an object at a fixed focal position. Further, if an event occurs out of the fixed focal position, it cannot be captured using the time slice techniques.

SUMMARY

According to at least one example embodiment, a video providing server that produces time slice videos includes: a receiving unit that may receive a first time slice video generated from images captured by multiple cameras having a focus on a first object; an input unit that receives, from a user device, a selection of a second object from among multiple objects displayed in the first time slice video; a feature point extraction unit that extracts feature points of the selected second object; a generating unit that generates a second time slice video having a focus on the second object based on the extracted feature points of the second object; and a transmitting unit that transmits, to the user device, the second time slice video.

According to at least one other example embodiment, a user device that receives a time slice video includes: a request unit that transmits a request for a first time slice video to a video providing server; a receiving unit that receives the requested first time slice video; a display unit that displays the first time slice video; and an object selection unit that facilitates selection of an object displayed in the first time slice video. The request unit also transmits, to the video providing server, a request to generate a second time slice video based on the selected object; the receiving unit also receives the requested second time slice video; and the display unit also displays the second time slice video.

According to at least one other example embodiment, a method for producing at least one time slice video includes: receiving, a first time slice video that is generated from images captured by from multiple cameras, each having a focus on a first object; receiving, from a user device, a selection of a second object from among multiple objects displayed in the first time slice video; extracting feature points of the selected second object; generating a second time slice video that has a focus on the second object, based on the extracted feature points of the second object; and providing, to the user device, the second time slice video having the focus on the second object.

This summary is provided by way of illustration only and should not be construed as limiting in any manner. Besides the above-described exemplary embodiments, there may be additional exemplary embodiments that become apparent by reference to the drawings and the detailed description that follows.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
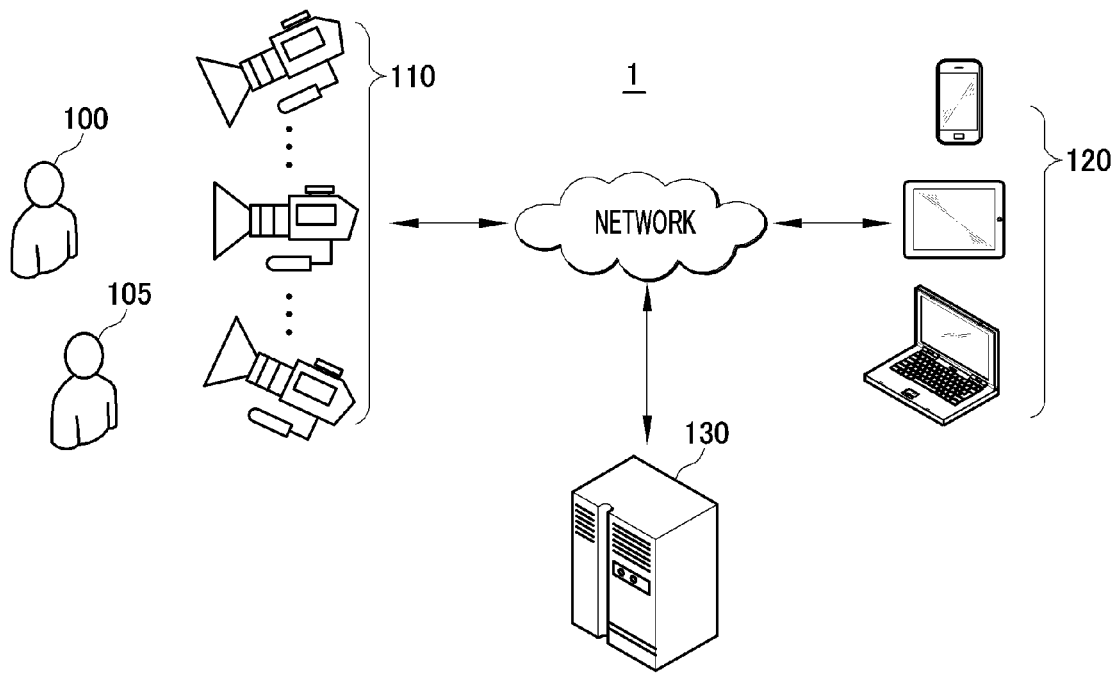
FIG. 1 is an illustration of an example configuration of a system that provides time slice videos, in accordance with various embodiments described herein.

Described and recited herein are systems, devices, apparatuses, and methods for producing time slice videos for objects that are in and beyond a focal position of a camera. Previously, a time slice effect has only been applied to objects at fixed focal positions.

The system embodiments may include a video providing server that applies a time slice effect to an object that may be out of the focal position of a camera and produces an object-oriented time slice video. The video providing server may further produce a reordered time slice video that is oriented to an object selected from an original time slice video by a user device.

According to any one of the aspects of the present disclosure, it is possible to provide a video providing server capable of applying a time slice effect, which has been applied only to an object at a fixed focal position, to other objects out of the focal position of a camera and providing an object-oriented time slice video, a method for providing a video, and a user device. It is possible to provide a video providing server capable of providing a reordered time slice video oriented to an object selected by a user device from an original time slice video, a method for providing a video, and a user device.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

FIG. 1 is an illustration of an example configuration of a system that provides time slice videos, in accordance with various embodiments described herein. Time slice video providing system 1 may include multiple cameras 110, a user device 120, and a video providing server 130. The multiple cameras 110, the user device 120, and the video providing server 130 illustrated in FIG. 1 are exemplary components that may be controlled by the time slice video providing system 1.

The components of the time slice video providing system 1 illustrated in FIG. 1 are typically connected through a network. For example, as illustrated in FIG. 1, the video providing server 130 may be connected to one or more of the multiple cameras 110 or to the user device 120 simultaneously or sequentially.

The network refers to a connection structure that enables the exchange of data between nodes such as one or more of cameras 110, one or more of devices 120, server 130, etc. Examples of the network may include 3G, 4G, 5G, Wi-Fi, Bluetooth, Internet, LAN (Local Area Network), Wireless LAN (Wireless Local Area Network), WAN (Wide Area Network), PAN (Personal Area Network), and the like, but are not limited thereto.

Respective ones of multiple cameras 110 may be located at predetermined distances from adjacent cameras. For example, multiple cameras 110 may be located in a sports arena or stadium. The predetermined distance between adjacent cameras may be equidistant from one camera to the next. However, taking into consideration physical obstacles or encumbrances that may prevent exactly equal spacing between cameras or, for example, considering that cameras 110 may located in an arena or stadium that is oval or elliptical in its configuration, equal spacing between respective cameras may not be possible. Thus, the predetermined distance between respective ones of cameras 110 may be deemed to be at least substantially equal from one camera to the next. Further, multiple cameras 110 are not limited in quantity to that shown in FIG. 1. Rather, while multiple cameras 110 have no limitations in terms of quantity, a time slice video may require at least three of such cameras to produce a quality product, and logistics and space limitations may cap a feasible number of such cameras for a given setting.

Regardless of the location of each one of multiple cameras 110, collectively multiple cameras 110 may be configured, programmed, or designed to record a reference video having a focus on a reference object having a specific pattern thereon. The specific pattern may include, for example, a grid pattern on which relative positions of respective ones of the multiple cameras 110 may be easily identified. Each of the multiple cameras 110 may transmit the reference video of the reference object to the video providing server 130. The reference video of the reference object having a specific pattern may be utilized to identify the relative positional relationship between the multiple cameras 110 based on the recorded specific pattern.

The multiple cameras 110 or a server (not illustrated) connected to the multiple cameras 110 may record or generate a first time slice video having a focus on a first object 100. As one example, multiple cameras 110 may collaborate to produce a single first time slice video. As another example, the server connected to the multiple cameras 110 may produce a single first time slice video. The multiple cameras 110 or the server may transmit, to the video providing server 130, the first time slice video having a focus on the first object 100.

User device 120 may both transmit a request for the first time slice video to the video providing server 130 and receive the first time slice video from the video providing server 130. For example, the first time slice video may have been published on the internet and the user device 120 can select the first time slice video The user device 120 may display the received first time slice video and also facilitate a user's selection of a second object 105, which is one of multiple objects included in the first time slice video. For example, a user can select the second object 105 by clicking the second object 105 on the user device or moving a predetermined rectangular area or a circular area to the second object 105.

The user device 120 may both transmit, to the video providing server 130, a request to generate a second time slice video oriented to the selected second object 105, and receive the generated second time slice video from the video providing server 130. The user device 120 may display the received second time slice video.

The user device 120 may reproduce an object-oriented time slice video that is generated by applying a time slice effect, which has been applied only to an object (first object) at a fixed focal position, to another object (second object) out of the focal position of a camera.

The video providing server 130 may receive, from each of the multiple cameras 110, the reference video of the reference object. The video providing server 130 may extract position information of the specific pattern formed or printed on the reference object from respective view point images of the reference video. The video providing server 130 may generate camera position matrix information indicative of a positional relationship between the multiple cameras 110 based on the extracted position information of the specific pattern.

The video providing server 130 may receive the first time slice video, having a focus on the first object 100, that is generated from images captured by the multiple cameras 110. The video providing server 130 may receive, from user device 120, the selection of the second object 105 from among the multiple objects included in the first time slice video.

The video providing server 130 may extract feature points of the selected second object 105. For example, the video providing server 130 may extract feature points of the second object 105 based on color boundary information of the second object 105 selected by the user device 120 through the predetermined object area.

The video providing server 130 may extract quasi-feature points of the second object 105 from respective view point images of the first time slice video based on the extracted feature point of the second object 105. For example, the video providing server 130 may determine whether the extracted quasi-feature points of the second object 105 is in a predetermined range. If the quasi-feature points of the second object 105 is in the predetermined range, the video providing server 130 may select object areas based on the quasi-feature points of the second object 105. If the quasi-feature point of the second object 105 is not in the predetermined range, the video providing server 130 may use the camera position matrix information of the multiple cameras 110 to predict a position information of the quasi-feature points of the second object 105 and may select object areas based on the predicted position information of the quasi-feature points of the second object 105.

The video providing server 130 may extract position information of the second object 105 based on the quasi-feature points of the second object 105. For example, the video providing server 130 may extract position information based on position information of the quasi-feature points of the second object 105 and position information of the object areas selected based on the quasi-feature point of the second object 105.

The video providing server 130 may extract, based on the position information of the second object 105, images of the second object 105 from the respective view point images of the first time slice video.

The video providing server 130 may generate a second time slice video by combining the extracted images of the second object 105, and transmit the second time slice video to the user device 120.

Figure 2:
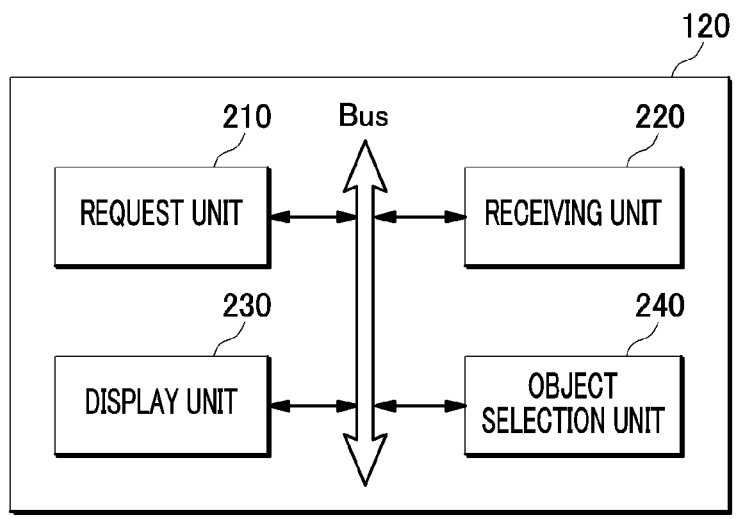
FIG. 2 is an example block diagram of a user device, in accordance with various embodiments described herein.

FIG. 2 is an example block diagram of a user device, in accordance with various embodiments described herein. User device 120 may include a request unit 210, a receiving unit 220, a display unit 230, and object selection unit 240.

The request unit 210 may be configured, programmed, or designed to transmit a request for a first time slice video to the video providing server 130. The first time slice video may be a time slice video that has been recorded with a fixed focus at a fixed time by the multiple cameras 110 located at respective predetermined distances from each other.

The request unit 210 may be configured, programmed, or designed to transmit, to the video providing server 130, a request to generate a second time slice video based on an object selected by the object selection unit 240, as described below. The request may be entered, via a UI (not shown) on a display of user device 120. The second time slice video may be an edited video having a focus on the object selected by a user from the first time slice video, which is an original video. For example, the second time slice video may be a time slice video oriented to the selected object and generated by extracting feature points of the selected object based on color boundary information of the object, extracting quasi-feature points of the object from respective view point images of the first time slice video based on the feature points of the object, extracting position information of the object based on the quasi-feature points of the object, extracting images of the object based on the position information of the object from the respective view point images of the first time slice video, and combining the extracted images of the object.

The receiving unit 220 may be configured, programmed, or designed to receive the requested first time slice video from the video providing server 130 and also may receive the second time slice video from the video providing server 130.

The display unit 230 may display both the first time slice video as well as the second time slice video, upon receipt thereof.

The object selection unit 240 may be configured, programmed, or designed to select any one of the multiple objects included in the first time slice video. For example, the object selection unit 240 may receive the user's selection of any one of the multiple objects included in the first time slice video through a predetermined object area. The predetermined object area may have, for example, a square shape and may be moved and enlarged or reduced by the user.

Figure 3:
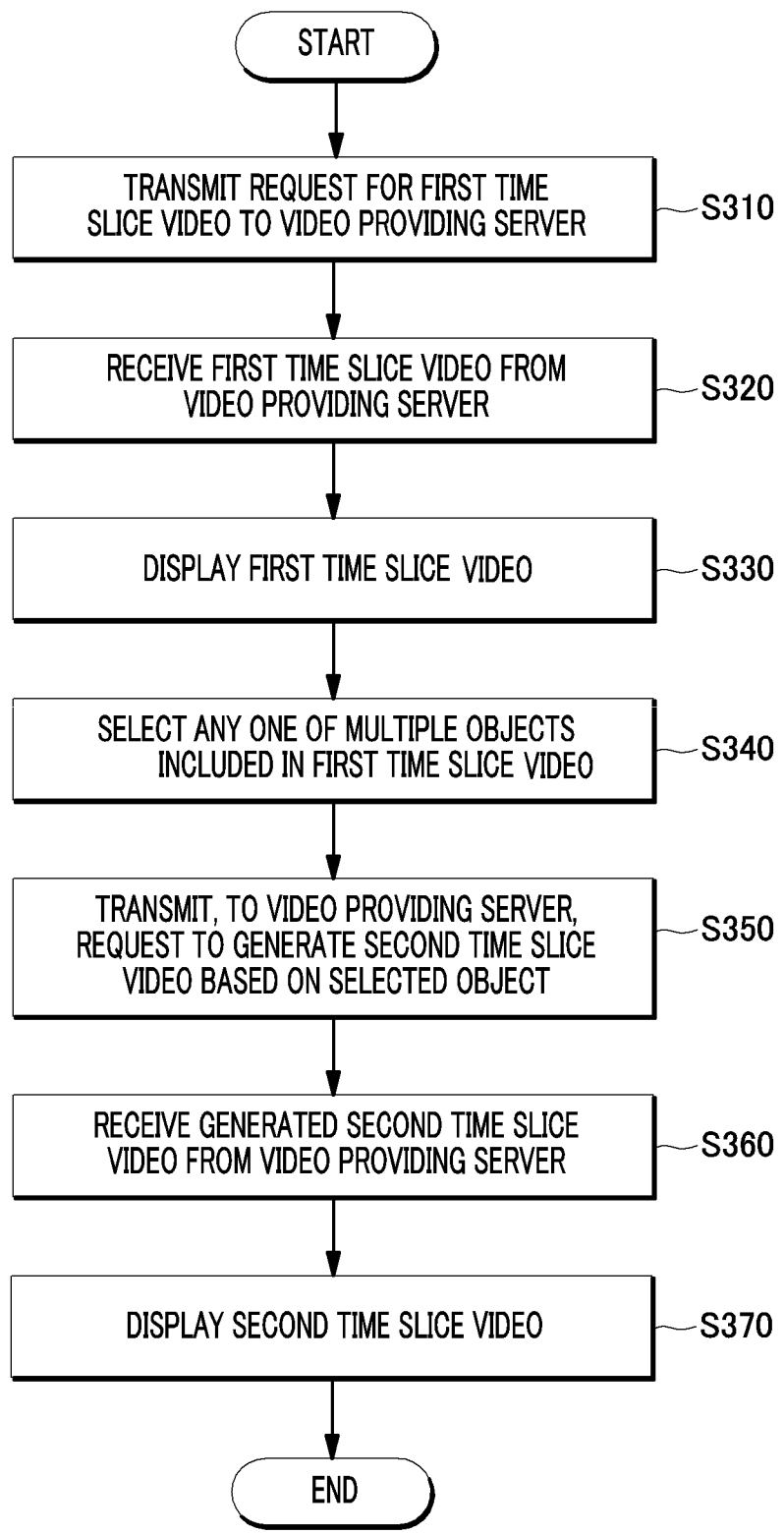
FIG. 3 shows an example processing flow for receiving an object-oriented time slice video by a user device, in accordance with various embodiments described herein.

FIG. 3 shows an example processing flow for receiving an object-oriented time slice video by a user device, in accordance with various embodiments described herein. As depicted, the processing flow of FIG. 3 for receiving an object-oriented time slice video by the user device 120 includes sub-processes executed by the example embodiments depicted in FIGS. 1 and 2, and described herein. However, the processing flow is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. The processing flow may include various operations, functions, or actions as illustrated by one or more of blocks S310, S320, S330, S340, S350, S360, and S370. These various operations, functions, or actions may, for example, correspond to software, program code or program instructions executable by a processor that causes the functions to be performed. Processing may begin at block S310.

At block S310, the user device 120 may transmit a request for a first time slice video to the video providing server 130. Processing may proceed to block S320.

At block S320, the user device 120 may receive the requested first time slice video from the video providing server 130. Processing may proceed to block S330.

At block S330, the user device 120 may display the first time slice video. Processing may proceed to block S340.

At block S340, the user device 120 may facilitate a user's selection of any one of multiple objects included in the first time slice video. Processing may proceed to block S350.

At block S350, the user device 120 may transmit, to the video providing server 130, a request to generate a second time slice video based on the selected object. Processing may proceed to block S360.

At block S360, the user device 120 may receive the generated second time slice video from the video providing server 130. The second time slice video may be generated by using feature points of the selected object extracted based on color boundary information of the object. The second time slice video may be generated by using quasi-feature points of the object from respective view point images of the first time slice video based on the feature points of the object and position information of the object extracted based on the quasi-feature points of the object. The second time slice video may be generated by using images of the object extracted based on the position information of the object. The second time slice video may be an object-oriented time slice video generated by combining the extracted images of the object. Processing may proceed to block S370.

At block S370, the user device 120 may display the second time slice video oriented to the selected object.

Figure 4:
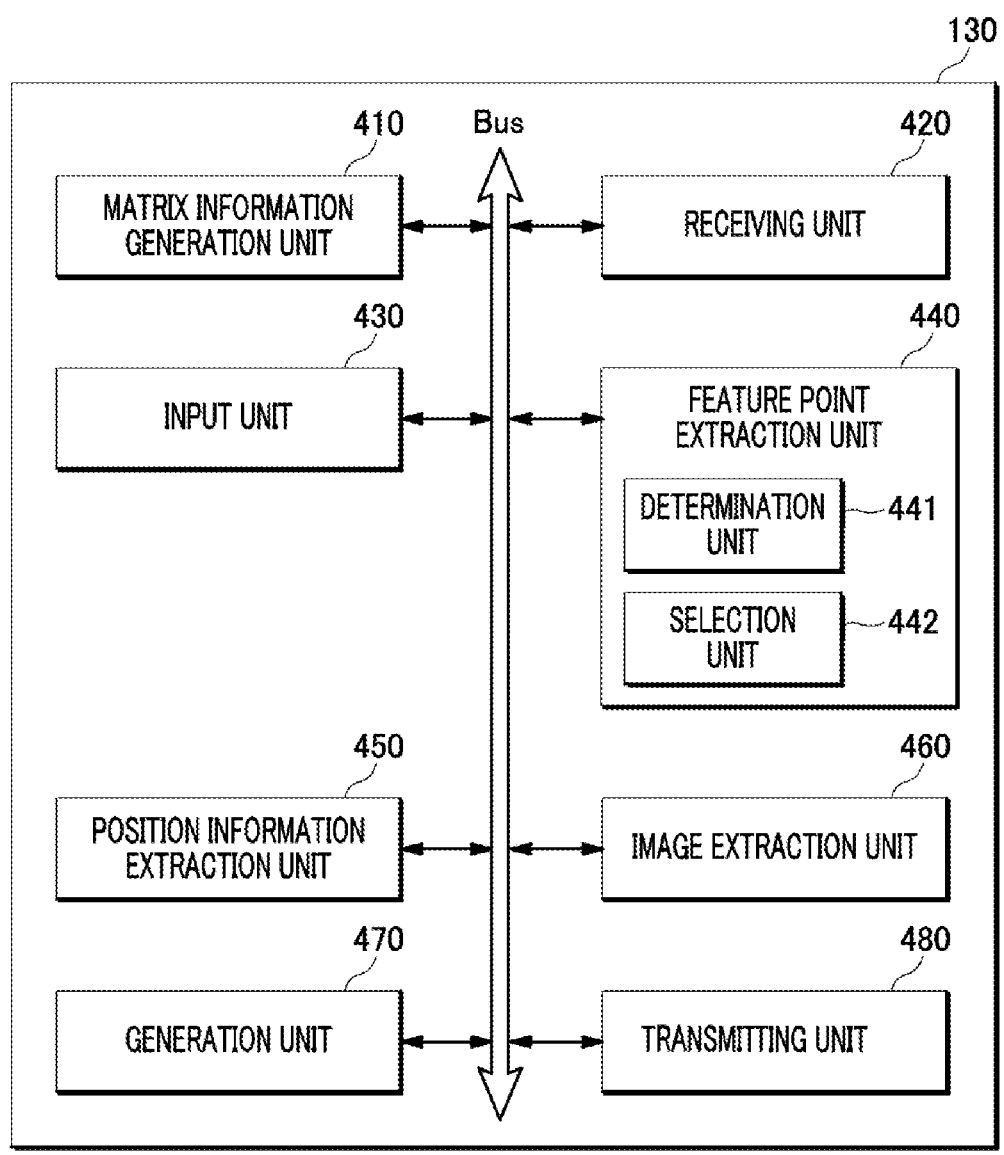
FIG. 4 is an example block diagram of a video providing server, in accordance with various embodiments described herein.

FIG. 4 is an example block diagram of a video providing server, in accordance with various embodiments described herein. Referring to FIG. 4, the video providing server 130 may include a matrix information generation unit 410, a receiving unit 420, an input unit 430, a feature point extraction unit 440, a position information extraction unit 450, an image extraction unit 460, a generation unit 470, and a transmitting unit 480.

The matrix information generation unit 410 may be configured, programmed, or designed to extract position information of a specific pattern of a reference object from respective view point images of the reference video. The specific pattern may include, for example, a grid pattern.

The matrix information generation unit 410 may be configured, programmed, or designed to generate camera position matrix information indicative of a positional relationship between multiple cameras 110 based on the extracted position information of the specific pattern. For example, the matrix information generation unit 410 may generate the camera position matrix information by converting position information of the same point of the specific pattern into position information of the respective cameras. The process of generating camera position matrix information by the matrix information generation unit 410 will be described in detail with reference to FIG. 5 and FIG. 6.

Figure 5:
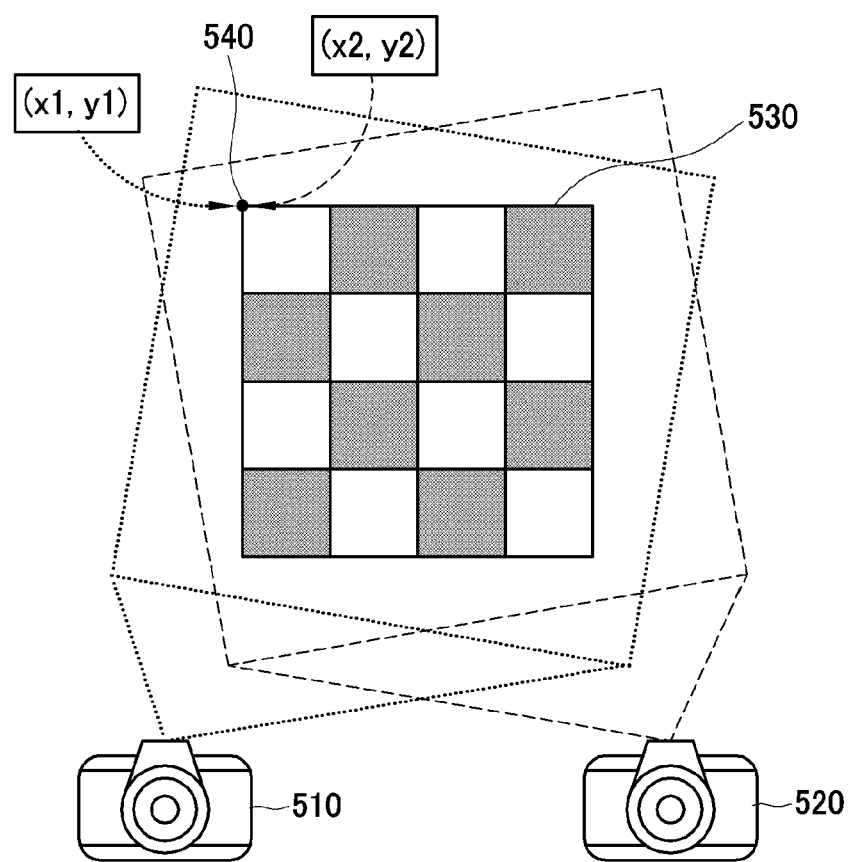
FIG. 5 is an example depiction of a display implemented to generate camera position matrix information, in accordance with at least one embodiment described herein.

FIG. 5 is an example depiction of a display implemented to generate camera position matrix information, in accordance with at least one embodiment described herein. Referring to FIG. 5, a first camera 510 and a second camera 520, which may refer to two of multiple cameras 110 located at different positions, a predetermined distance apart, may record a time slice video of a reference object 530 having a grid pattern.

Since the first camera 510 and the second camera 520 record the reference object 530 from different positions, the position of the reference object 530 may have different values. For example, when recorded by the first camera 510, the position of a first point 540 of the reference object 530 may be (x1, y1), and when recorded by the second camera 520, the position of the first point 540 of the reference object 530 may be (x2, y2).

The matrix information generation unit 410 may use the following Equation 1 to generate camera position matrix information.

[Equation 1]

$$(x2, y2) = (x1, y1) * \text{Matrix}\_ij$$

For example, the matrix information generation unit 410 may use Equation 1 to generate camera position matrix information indicative of a relative positions relationship between the first camera 510 and the second camera 520 based on the position information of the specific pattern. Further, the matrix information generation unit 410 may use Equation 1 to generate extended camera position matrix information indicative of relative positions relationships among a first camera to $N_{th}$ camera. For example, the camera position matrix information may be 3 by 3 matrix as shown in Matrix 1.

$$\begin{bmatrix} M11 & M12 & M13 \\ M21 & M22 & M23 \\ M31 & M32 & M33 \end{bmatrix} \quad [\text{Matrix 1}]$$

Figure 6:
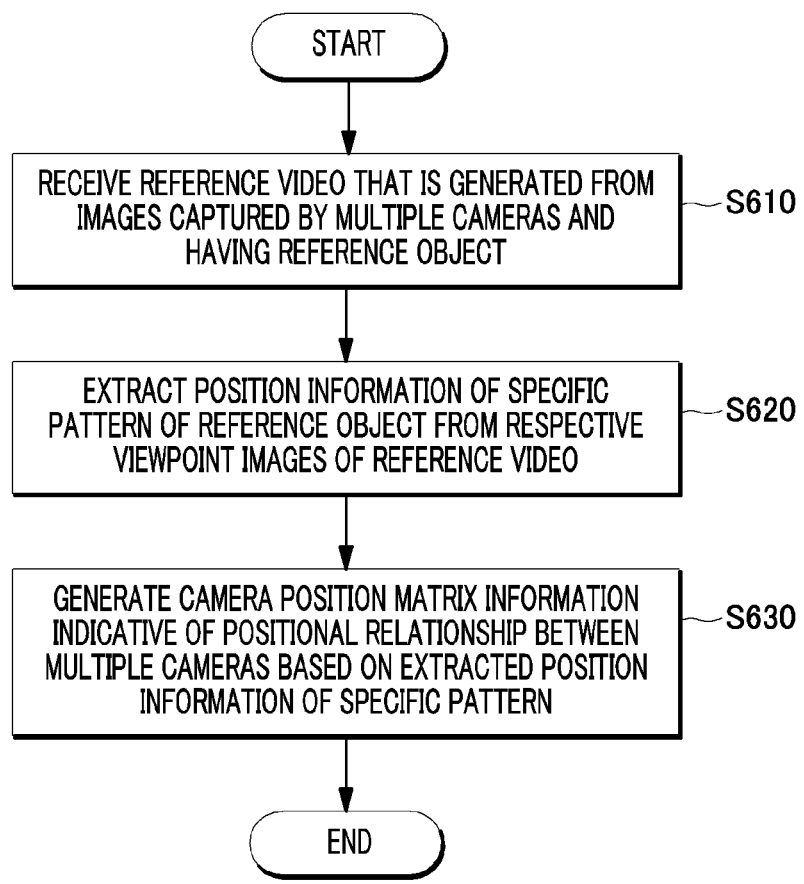
FIG. 6 is an example processing flow for generating camera position matrix information by a video providing server, in accordance with various embodiments described herein.

FIG. 6 is an example processing flow for generating camera position matrix information by a video providing server, in accordance with various embodiments described herein. As depicted, the processing flow of FIG. 6 for generating camera position matrix information by the video providing server 130 includes sub-processes executed by the example embodiments depicted in FIGS. 1-5, and described herein. However, the processing flow is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. The processing flow may include various operations, functions, or actions as illustrated by one or more of blocks S610, S620, and S630. These various operations, functions, or actions may, for example, correspond to software, program code or program instructions executable by a processor that causes the functions to be performed. Processing may begin at block S610.

At block S610, the video providing server 130 may receive a reference video that is generated from images captured by the multiple cameras 110 and having a focus on a reference object formed into a specific pattern. Processing may proceed to block S620.

At block S620, the video providing server 130 may extract, from the recorded video, position information of the specific pattern of the reference object from respective view point images of the reference video. Processing may proceed to block S630.

At block S630, the video providing server 130 may generate camera position matrix information indicative of a positional relationship between multiple cameras based on the extracted position information of the specific pattern by using Equation 1.

Referring to FIG. 4 again, the receiving unit 420 may be configured, programmed, or designed to receive a reference video that is generated from images captured by the multiple cameras and having a focus on a reference object, as well as a first time slice video having a focus on a first object.

The input unit 430 may be configured, programmed, or designed to receive, from the user device 120, selection of a second object among multiple objects included in the first time slice video. For example, the input unit 430 may receive, from the user device 120, a user's selection of a second object from among multiple objects included in the first time slice video by moving and enlarging/reducing a square object area.

The feature point extraction unit 440 may be configured, programmed, or designed to extract feature points of the selected second object based on color boundary information of the second object selected by the user device 120 through the predetermined object area. For example, if the selected second object is a baseball player whose uniform includes, e.g., a blue top and white pants, the feature point extraction unit 440 may extract, as a feature point of the second object, a point where the color changes from blue to white in the object area.

The feature point extraction unit 440 may be configured, programmed, or designed to extract quasi-feature points of the second object from respective view point images of the first time slice video based on the extracted feature points of the second object.

The feature point extraction unit 440 may include a determination unit 441 and a selection unit 442.

The determination unit 441 may be configured, programmed, or designed to determine whether the extracted quasi-feature points of the second object is in a predetermined range provided in respective view point images of the first time slice video. If the determination unit 441 determines that the quasi-feature point of the second object is not in the predetermined range, the feature point extraction unit 440 may use the camera position matrix information of the multiple cameras 110 to predict position information of the quasi-feature points of the second object. To this end, the determination unit 441 may use the following Equation 2.

$$\text{ObjFeature2}(x,y) = \text{ObjFeature1}(x,y) \times \text{MatrixCam}i\_j \qquad \text{[Equation 2]}$$

The determination unit 441 may select an object area using a difference value for each of vertical and horizontal widths and a height of the position of the quasi-feature points of the second object according to Equation 2. Herein, MaxtrixCami_j may be previously generated camera position matrix information indicative of a positional relationship between the multiple cameras 110.

If the quasi-feature points of the second object is in the predetermined range, the selection unit 442 may select object areas based on the quasi-feature points of the second object. If the quasi-feature points of the second object is not in the predetermined range, the selection unit 442 may select object areas based on the predicted position information of the quasi-feature points of the second object. In this regard, the process of selecting quasi-feature points of the second object and selecting object areas based on the quasi-feature points of the second object by the feature point extraction unit 440 will be described in detail with reference to FIG. 7.

Figure 7:
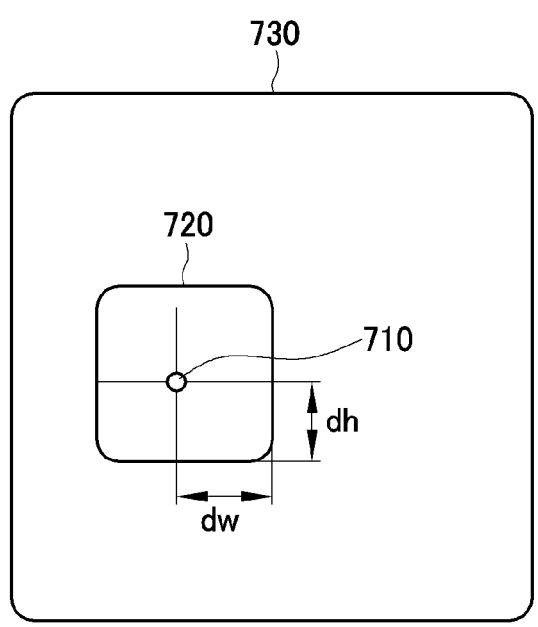
FIG. 7 is an example depiction of a display implemented to extract images based on a feature point of an object and an object area, in accordance with at least one embodiment described herein.

FIG. 7 is an example depiction of a display implemented to extract images based on a feature point of an object and an object area, in accordance with at least one embodiment described herein. The feature point extraction unit 440 may extract feature points of the second object based on color boundary information of the second object selected through an object area. In this case, the feature point extraction unit 440 may select object areas base on the feature points of the second object.

The feature point extraction unit 440 may be configured, programmed, or designed to extract quasi-feature points 710 of the second object from respective view point images of the first time slice video 730 based on the extracted feature points of the second object. In this case, the feature point extraction unit 440 may select an object area 720 having width dw and a height dh, which are identical to those of the feature points of the second object based on the quasi-feature points 710 of the second object.

Referring to FIG. 4 again, the position information extraction unit 450 may be configured, programmed, or designed to extract position information of the second object from each frame based on the quasi-feature points of the second object. The position information extraction unit 450 may extract position information based on position information of the quasi-feature points of the second object and position information of the object area selected based on the quasi-feature points of the second object.

The image extraction unit 460 may be configured, programmed, or designed to extract, based on the position information of the second object, images of the second object from the respective view point images of the first time slice video. For example, the image extraction unit 460 may extract images of the second object based on the position information of the quasi-feature points of the second object and the object area selected based on the quasi-feature points of the second object.

The generation unit 470 may be configured, programmed, or designed to generate a second time slice video having a focus on the second object by combining the extracted images of the second object.

The transmitting unit 480 may transmit, to the user device, the second time slice video having a focus on the second object.

Figure 8:
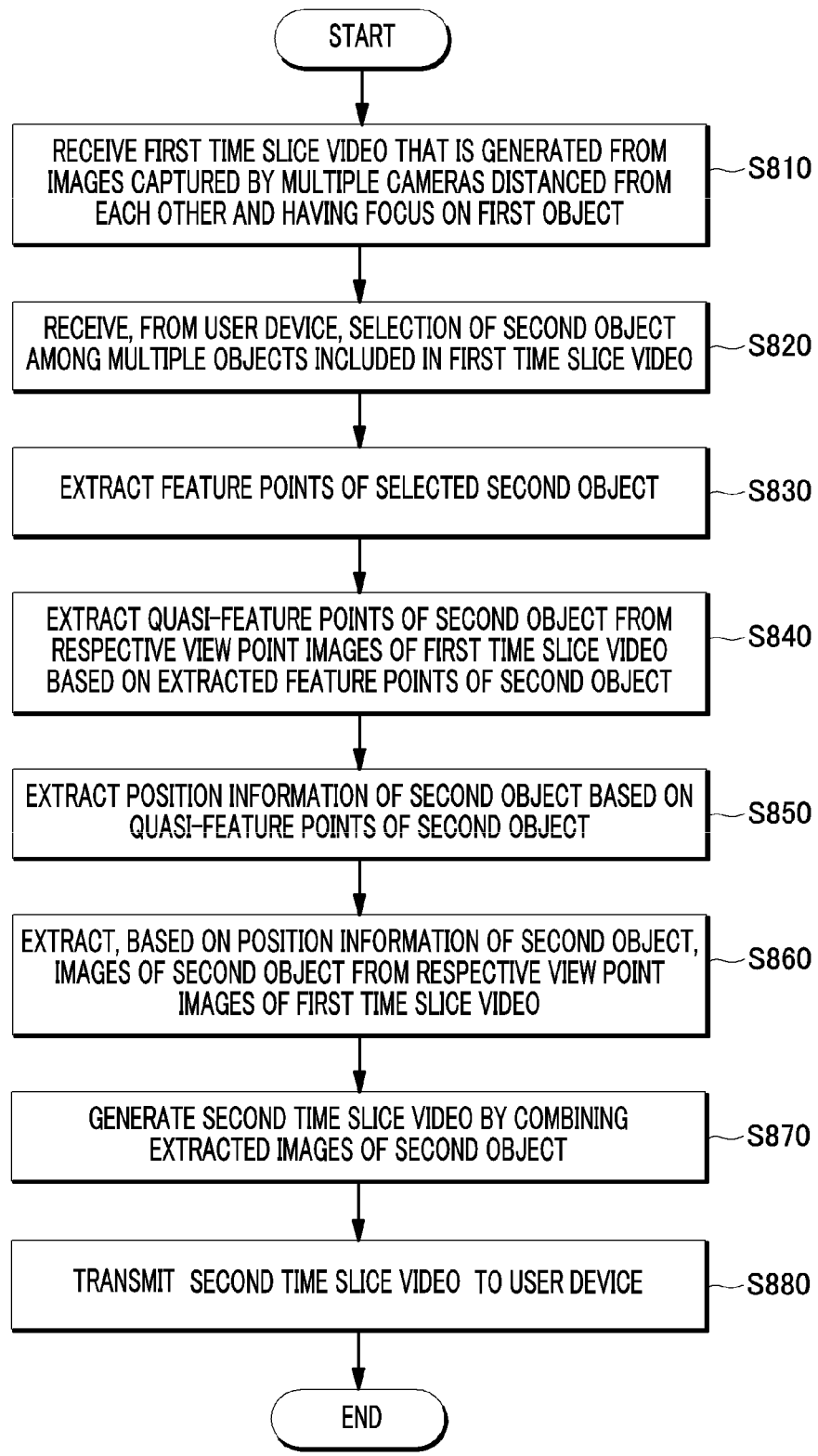
FIG. 8 is an example processing flow for providing an object-oriented time slice video by a video providing server, in accordance with various embodiments described herein.

FIG. 8 is an example processing flow for providing an object-oriented time slice video by a video providing server, in accordance with various embodiments described herein. As depicted, the processing flow of FIG. 8 for providing an object-oriented time slice video by the video providing server 130 includes sub-processes executed by the example embodiments depicted in FIGS. 1-7, and described herein. However, the processing flow is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. The processing flow may include various operations, functions, or actions as illustrated by one or more of blocks S810, S820, S830, S840, S850, S860, S870, and S880. These various operations, functions, or actions may, for example, correspond to software, program code or program instructions executable by a processor that causes the functions to be performed. Processing may begin at block S810.

At block S810, the video providing server 130 may receive a first time slice video that is generated from images captured by multiple cameras distanced from each other and having a focus on a first object. Processing may proceed to block S820.

At block S820, the video providing server 130 may receive, from the user device 120, selection of a second object among multiple objects included in the first time slice video. Processing may proceed to block S830.

At block S830, the video providing server 130 may extract feature points of the selected second object. Processing may proceed to block S840.

At block S840, the video providing server 130 may extract quasi-feature points of the second object from respective view point images of the first time slice video based on the extracted feature points of the second object. Processing may proceed to block S850.

At block S850, the video providing server 130 may extract position information of the second object based on the quasi-feature points of the second object. For example, the video providing server 130 may extract position information based on position information of the quasi-feature points of the second object and position information of an object area selected based on the quasi-feature points of the second object. Processing may proceed to block S860.

At block S860, the video providing server 130 may extract, based on the position information of the second object, images of the second object from the respective view point images of the first time slice video. Processing may proceed to block S870.

At block S870, the video providing server 130 may generate a second time slice video having a focus on the second object by combining the extracted images of the second object. Processing may proceed to block S880.

At block S880, the video providing server 130 may provide, to the user device 120, the second time slice video with a focus on the second object.

Although not illustrated in FIG. 8, in the process of extracting the quasi-feature point of the second object, the video providing server 130 may further determine whether the quasi-feature point of the second object is in a predetermined range and select an object area based on the quasi-feature point of the second object if the quasi-feature point of the second object is in the predetermined range.

Although not illustrated in FIG. 8, in the process of extracting the quasi-feature point of the second object, the video providing server 130 may further predict a position of the quasi-feature point of the second object using the camera position matrix information of the multiple cameras 110 if the quasi-feature point of the second object is not in the predetermined range and select an object area based on the predicted position of the quasi-feature point of the second object.

Figure 9:
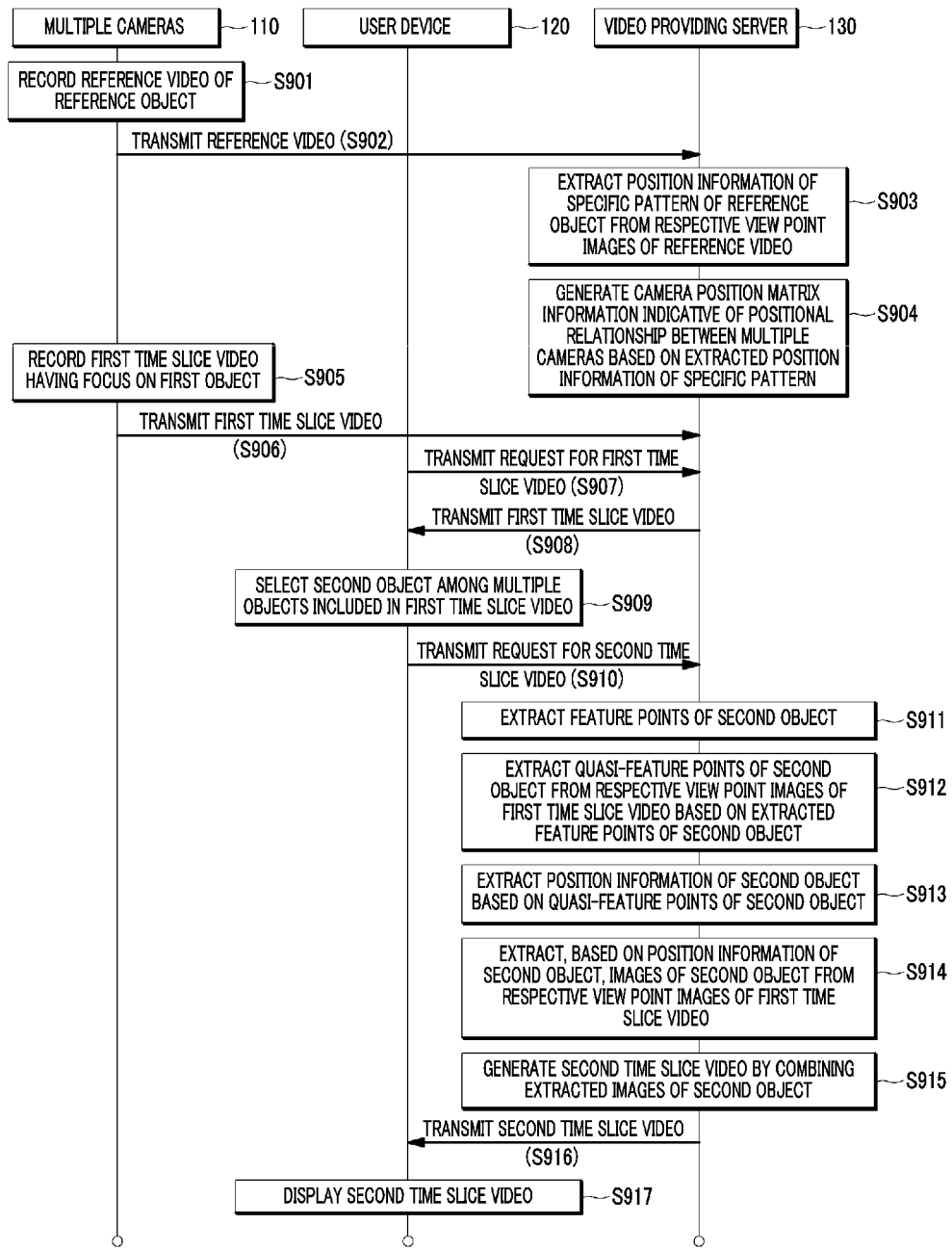
FIG. 9 is an example processing flow for providing an object-oriented time slice video by a time slice video providing system, in accordance with various embodiments described herein.

FIG. 9 is an example processing flow for providing an object-oriented time slice video by a time slice video providing system, in accordance with various embodiments described herein. Referring to FIG. 9, the time slice video providing system 1 may include the multiple cameras 110, the user device 120, and the video providing server 130.

Respective ones of multiple cameras 110 may be located at predetermined distances from adjacent cameras and may reference a video of a reference object formed into a specific pattern (S901) and transmit the reference video of the reference object to the video providing server 130 (S902).

The video providing server 130 may extract position information of the specific pattern of a reference object from respective view point images of the reference video (S903) and generate camera position matrix information indicative of a positional relationship between the multiple cameras 110 based on the extracted position information of the specific pattern (S904).

The multiple cameras 110 or a server connected to the multiple cameras 110 may generate a first time slice video having a focus on a first object (S905) and transmit the recorded first time slice video to the video providing server 130 (S906).

If the user device 120 transmits a request for the first time slice video to the video providing server 130 (S907), the video providing server 130 may transmit the first time slice video to the user device 120 (S908).

The user device 120 may select a second object among multiple objects included in the first time slice video through a predetermined object area (S909) and transmit, to the video providing server 130, a request for a second time slice video having a focus on a second object (S910).

The video providing server 130 may extract feature points of the second object (S911), extract quasi-feature points of the second object from respective view point images of the first time slice video based on the extracted feature points of the second object (S912), extract position information of the second object based on the quasi-feature points of the second object (S913), extract, based on the position information of the second object, images of the second object from the respective view point images of the first time slice video (S914), generate a second time slice video having a focus on the second object by combining the extracted images of the second object (S915), and transmit the generated second time slice video to the user device 120 (S916).

The user device 120 may display the second time slice video on the display (S917).

In the descriptions above, the processes S901 to S917 may be divided into additional processes or combined into fewer processes depending on an embodiment. In addition, some of the processes may be omitted and the sequence of the processes may be changed if necessary.

The method for providing time slice video by the time slice video providing server and the user device described above with reference to FIG. 1 to FIG. 9 can be implemented in a computer program stored in a medium to be executed by a computer or a storage medium including instructions codes executable by a computer. Also, the method for providing time slice video by the time slice video providing server and the user device described above with reference to FIG. 1 to FIG. 8 can be implemented in a computer program stored in a medium to be executed by a computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A video providing server that provides a time slice video, comprising:
   a receiving unit configured to receive a first time slice video that is generated from images captured by multiple cameras distanced from each other and having a focus on a first object;
   an input unit configured to receive, from a user device, selection of a second object among multiple objects displayed in the first time slice video;
   a feature point extraction unit configured to extract feature points of the selected second object;
   a generation unit configured to generate a second time slice video having a focus on the second object based on the extracted feature points of the second object; and
   a providing unit configured to provide, to the user device, the second time slice video having the focus on the second object, and
   wherein the feature point extraction unit is further configured to:

extract quasi-feature points of the second object from respective view point images of the first time slice video based on the extracted feature points of the second object, determine whether the extracted quasi-feature points of the second object are in a predetermined range, and predict position information of the quasi-feature points of the second object using camera position matrix information of the multiple cameras if the quasi-feature points of the second object is not in the predetermined range, and the generation unit is further configured to generate the second time slice video based on the predicted position information of the quasi-feature points of the second object.

2. The video providing server of claim 1, further comprising:

a position information extraction unit configured to extract position information of the second object based on the quasi-feature points of the second object; and an image extraction unit configured to extract, based on the position information of the second object, images of the second object from the respective view point images of the first time slice video, wherein the generation unit is further configured to generate the second time slice video by combining the extracted images of the second object.

3. The video providing server of claim 1, wherein the receiving unit is further configured to receive a reference video that is generated from images captured by the multiple cameras and having a focus on a reference object.

4. The video providing server of claim 3, further comprising:

a matrix information generation unit configured to extract position information of a specific pattern of the reference object from respective view point images of the reference video and generate camera position matrix information indicative of a positional relationship between the multiple cameras based on the extracted position information of the specific pattern.

5. The video providing server of claim 1, wherein the feature point extraction unit includes:

a selection unit configured to select object areas based on the quasi-feature points of the second object if the quasi-feature points of the second object is in the predetermined range.

6. The video providing server of claim 5, wherein the position information extraction unit is further configured to extract position information of the second object based on the position information of the quasi-feature points of the second object and position information of the object areas selected based on the quasi-feature points of the second object.

7. The video providing server of claim 5, wherein the selection unit is further configured to select the object areas based on the predicted position information of the quasi-feature points of the second object.

8. The video providing server of claim 1, wherein the feature point extraction unit is further configured to extract the feature points of the second object based on color boundary information of the second object selected by the user device.

9. A user device that receives a time slice video, comprising:

a request unit configured to transmit a request for a first time slice video to a video providing server;

a receiving unit configured to receive the first time slice video from the video providing server;

a display unit configured to display the first time slice video; and an object selection unit configured to select any one of multiple objects displayed in the first time slice video, wherein the request unit is further configured to transmit, to the video providing server, a request to generate a second time slice video having a focus on the selected objet, the receiving unit is further configured to receive the generated second time slice video from the video providing server, and the display unit is further configured to display the second time slice video, and wherein quasi-feature points of the selected object are extracted from respective view point images of the first time slice video based on feature points of the selected object, it is determined whether the extracted quasi-feature points of the second object is in a predetermined range, position information of the quasi-feature points of the selected object is predicted by using camera position matrix information of multiple cameras if the quasi-feature points of the second object is not in the predetermined range, and the second time slice video is generated based on the predicted position information of the quasi-feature points of the selected object.

10. The user device of claim 9, wherein the second time slice video is generated by using feature points of the selected object extracted based on color boundary information of the selected object.

11. The user device of claim 10, wherein the second time slice video is generated by using the quasi-feature points of the selected object and position information of the selected object extracted based on the quasi-feature points of the object.

12. The user device of claim 11, wherein the second time slice video is generated by using images of the object extracted based on the position information of the object from the respective view point images of the first time slice video.

13. The user device of claim 12, wherein the second time slice video is generated by combining the extracted images of the object.

14. A method for providing a time slice video to a video providing server, comprising:

receiving, a first time slice video that is generated from images captured by multiple cameras distanced from each other, having a focus on a first object;

receiving, from a user device, selection of a second object among multiple objects displayed in the first time slice video;

extracting feature points of the selected second object;

generating a second time slice video having a focus on the second object based on the extracted feature points of the second object;

providing, to the user device, the second time slice video having the focus on the second object; and extracting quasi-feature points of the second object from respective view point images of the first time slice video based on the extracted feature points of the second object;

determining whether the extracted quasi-feature points of the second object is in a predetermined range, and predicting position information of the quasi-feature points of the second object by using camera position matrix information of the multiple cameras if the quasi-feature points of the second object is not in the predetermined range, and wherein the generating of the second time slice video comprises:
generating the second time slice video based on the predicted position information of the quasi-feature points of the second object.

15. The method of claim 14, further comprising:
extracting position information of the second object based on the quasi-feature points of the second object; and
extracting, based on the position information of the second object, images of the second object from the respective view point images of the first time slice video, wherein the generating of the time slice video with a focus on the second object further includes:
generating the second time slice video by combining the extracted images of the second object.

16. The method of claim 14, wherein the extracting of the quasi-feature point of the second object includes:
selecting object areas based on the quasi-feature points of the second object if the quasi-feature points of the second object is in the predetermined range.

17. The method of claim 16, wherein the extracting of the quasi-feature point of the second object includes:
selecting the object areas based on the predicted position information of the quasi-feature points of the second object.

* * * * *